United States Patent [19]

Matsumoto et al.

[11] 4,422,349
[45] Dec. 27, 1983

[54] TORQUE TRANSFER DEVICE FOR A FOUR WHEEL DRIVE VEHICLE

[75] Inventors: Gohichi Matsumoto, Okazaki; Yohichi Hayakawa, Toyoake, both of Japan

[73] Assignee: Aisin Warner Kabushiki Kaisha, Aichi, Japan

[21] Appl. No.: 207,836

[22] Filed: Nov. 18, 1980

[30] Foreign Application Priority Data

Nov. 26, 1979 [JP] Japan .................. 54-153277

[51] Int. Cl.³ .................. F16H 37/06; F16H 57/10
[52] U.S. Cl. .................. 74/665 GE; 74/785; 74/787; 180/247
[58] Field of Search .......... 74/665 G, 665 GE, 665 F, 74/740, 785, 786, 787, 788; 180/244, 247

[56] References Cited

U.S. PATENT DOCUMENTS

| | | | |
|---|---|---|---|
| 2,853,890 | 9/1958 | Kelbel | 74/740 |
| 2,855,807 | 10/1958 | Gerst | 74/740 |
| 3,095,758 | 7/1963 | Bixby | 74/740 |
| 3,251,243 | 5/1966 | Kress | 74/740 |
| 3,378,093 | 4/1968 | Hill | 74/665 F |
| 3,386,532 | 6/1968 | Moss | 192/4 A |
| 3,505,904 | 4/1970 | Williams, Jr. | 74/665 G |
| 4,103,753 | 8/1978 | Holdeman | 74/785 |
| 4,298,085 | 11/1981 | Moroto | 180/247 |
| 4,344,335 | 8/1982 | Kawai | 180/247 |

FOREIGN PATENT DOCUMENTS

| | | | |
|---|---|---|---|
| 2733538 | 2/1978 | Fed. Rep. of Germany | 192/4 A |
| 53-522 | 1/1978 | Japan | 74/740 |
| 1445245 | 8/1976 | United Kingdom | 192/4 A |

OTHER PUBLICATIONS

Twin Disc 2-Speed Transmission, Model T-302, p. 10, 5/15/53.

*Primary Examiner*—Leslie A. Braun
*Assistant Examiner*—D. Wright
*Attorney, Agent, or Firm*—Blum, Kaplan, Friedman, Silberman & Beran

[57] ABSTRACT

A four wheel drive torque transfer device is switchable between two wheel drive and four wheel drive during running operation of a vehicle having an automatic transmission. A reducer permits direct coupling or reduced speed drives. A parking gear associating with the transfer device requires only small modification to the conventional parking mechanism.

10 Claims, 2 Drawing Figures

TORQUE TRANSFER DEVICE FOR A FOUR WHEEL DRIVE VEHICLE

BACKGROUND OF THE INVENTION

This invention relates generally to a torque transfer device for vehicles with an automatic transmission and more particularly, to a torque transfer device for vehicles having the option of a two or a four wheel drive. Four wheel drive vehicles are becoming more popular in both large and small vehicles. These vehicles generally provide for the option of either two or four wheel drive. However, the torque transfer devices associated with these vehicles are complex, do not operate smoothly, and component wear is high.

What is needed is a torque transfer device for a four wheel drive vehicle which is simple in construction, smooth in operation and has a long operating life. The ability to shift between two and four wheel drive and to reduce speed while the vehicle is in motion is also desirable.

SUMMARY OF THE INVENTION

Generally speaking, in accordance with the invention, a torque transfer device especially suitable for a four wheel drive vehicle is provided. The transfer device is mounted on a vehicle with an automatic transmission and includes a reducer which provides for direct coupling and reduced speed drives. The transfer device allows for switching between two wheel and four wheel drive during running operation of the vehicle. This has been difficult to accomplish in prior art four wheel drive transfer systems.

The torque transfer mechanism includes an input shaft for receiving torque from a gear transmission, a first output shaft coupled with one of the front and rear drive axles, a second output shaft coupled with the other one of the drive axles, a link mechanism coupling the second output shaft with the first output shaft, a planetary gear set mounted on the input shaft, brake means, first clutch means and second clutch means. The sun gear of the planetary gear set is coupled with the input shaft while the planetary carrier of the gear set is coupled with the first output shaft. The brake means, first clutch means and second clutch means are provided respectively between the ring gear of the gear set and a stationary element, between the planetary carrier of the gear set and the input shaft, and between the link mechanism and the first output shaft. Upon engaging the first clutch means, the first input shaft is coupled with the first output shaft. Application of the brake means reduces the rotational speed which is transmitted from the input shaft to the first output shaft. Upon disengaging the second clutch means, the torque of the gear transmission is transmitted to only one of the drive axles.

Accordingly, it is an object of this invention to provide an improved torque transfer device for a four wheel drive which is shiftable for direct coupling and driving at reduced speed conditions.

Another object of this invention is to provide an improved torque transfer device for a four wheel drive vehicle which is adapted to deliver engine power directly to the output shaft of the transfer device in normal operating conditions.

A further object of this invention is to provide an improved torque transfer device for four wheel drive vehicles including a speed reducer between the input shaft and the output shaft.

Still another object of this invention is to provide an improved torque transfer device for a four wheel drive vehicle having a reducer which is bypassed under normal operating conditions thereby prolonging the service life of the reducer.

Yet another object of this invention is to provide an improved torque transfer device for a four wheel drive vehicle having an output shaft coupled with a parking gear of an automatic transmission, whereby only slight modification of the conventional parking mechanism is required.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1:
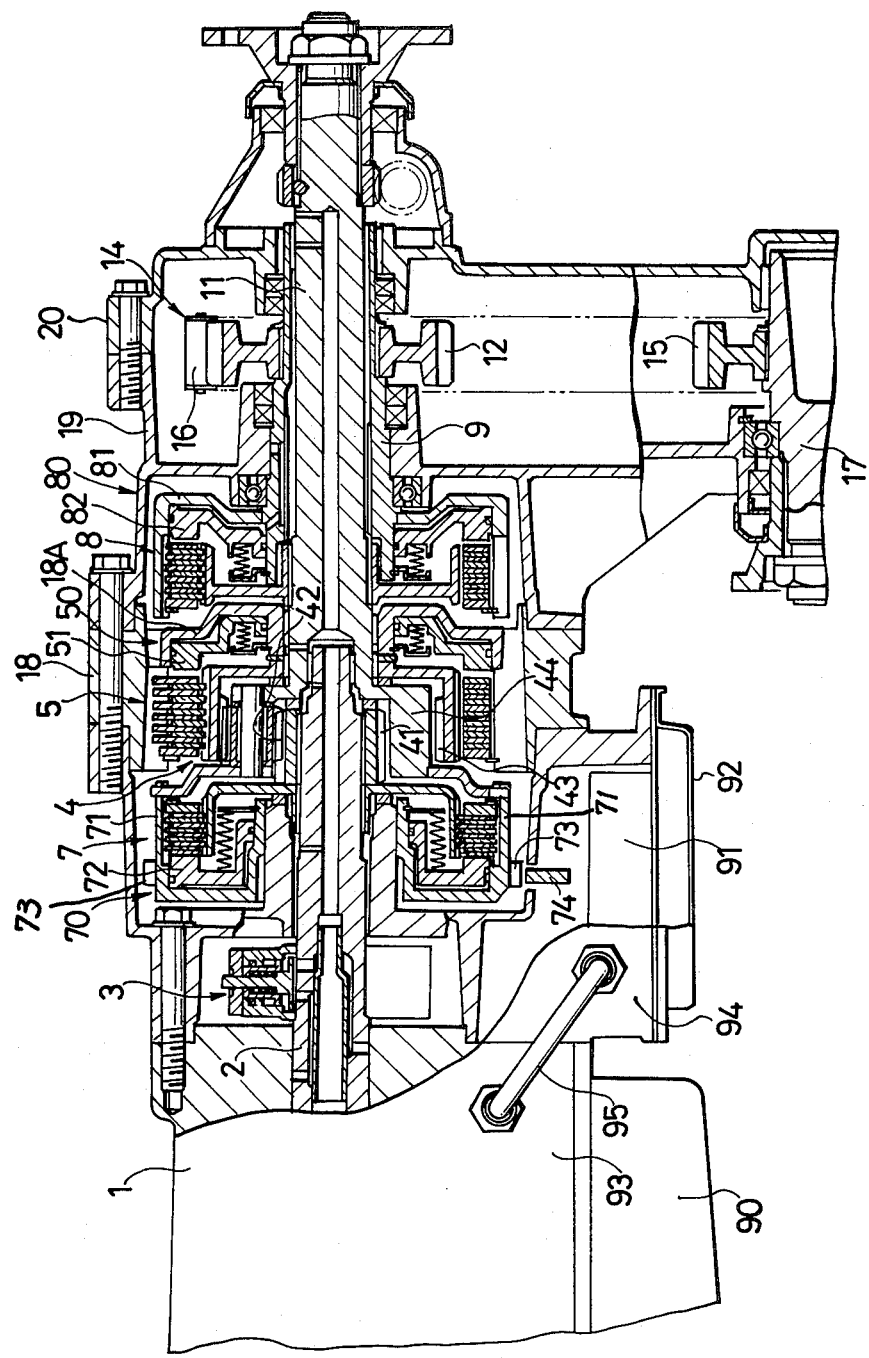
FIG. 1 is a schematic sectional view of a transfer device in accordance with this invention.

Referring to FIG. 1, there is shown a four wheel drive torque transfer device according to the present invention. The transfer device is connected to an automatic transmission 1 and includes an input shaft 2 which also serves as an output shaft of the gear mechanism of the automatic transmission 1. Also included in the transfer device is a governor valve 3 fixedly mounted on the input shaft 2; a planetary gear set 4 having a sun gear 41 splined on the input shaft 2, a pinion 42 meshed with the sun gear 41, a ring gear 43 meshed with the pinion 42 and a carrier 44 rotatably supporting the pinion 42 and coupled with one output shaft 11 of the transfer device. The transfer device also includes: a friction brake 5 for engaging the ring gear 43 with a transfer casing 18; a hydraulic servor motor 50 for the friction brake 5 comprised of a cylinder 18A formed in the transfer casing 18 and a piston 51 slidably fitted in the cylinder 18A; a friction clutch 7 operated by a hydraulic servo motor 70 comprising an annular cylinder 71 connected to the carrier 44 and a piston 72 slidably fitted in the cyclinder 71, for coupling and uncoupling the sun gear 41 and the carrier 44. The transfer device further includes a friction clutch 8 for coupling the output shaft 11, connected to the carrier 44, with a sleeve 9 connected to one of the sprockets 12 of a linkage mechanism which drives the other output shaft 17 of the transfer device as will be described hereinafter. Also, included in the transfer device are a hydraulic servo motor 80 comprising a cylinder 81 welded to the sleeve 9, which is rotatably retained in the transfer casings 19, 20 and a piston 82 slidably fitted in the cylinder 81; an other output shaft 17 of the transfer device; and a link mechanism 14 comprised of the sprocket 12 splined on the sleeve 9, a sprocket 15 splined on the output shaft 17 and a chain 16 passed around the sprockets 12 and 15.

The annular hydraulic cylinder 71 of the friction clutch 7 is formed with a circumferential parking gear 73 which is engageable with a parking lock pawl 74 when the shift lever of the automatic transmission is switched to parking position, thereby locking the output shaft 11.

FIG. 1 also shows an oil pan 90 of the automatic transmission, a hydraulic control system (valve casing) 91 which controls oil flow to and from the hydraulic servo motors 70, 80, 50 of the clutches 7, 8 and brake 5 respectively of the four wheel drive torque transfer device, and an oil pan 92 for the hydraulic control system 91. Oil pressures are supplied from the oil pan 90 to the hydraulic servo motors 70, 80, 50 of the clutches 7, 8 and the brake 5 by the operation of the hydraulic control system 91 through a pipe 95 which is mounted on a casing 93 of the automatic transmission 1 and a transfer casing 94.

Figure 2:
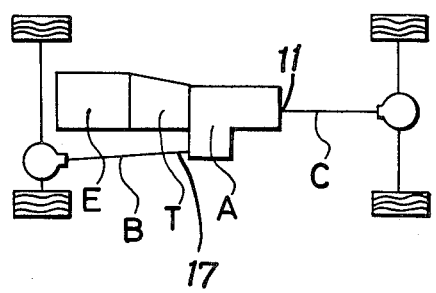
FIG. 2 is a diagram of a vehicle using the transfer device of FIG. 1.

As shown at A of FIG. 2, the transfer device is attached to an automatic transmission T of a vehicle engine E and has one of its output shafts 11 coupled with a rear propeller shaft C and the other output shaft 17 coupled with a front propeller shaft B.

In a normal operating conditions, the line pressure which is supplied from the hydraulic control system of the automatic transmission is fed to the servo motor 70 to engage the clutch 7, while draining the servo motors 50, 80 to release the brake 5 and clutch 8 respectively. As a result, the sun gear 41 and carrier 44 of the planetary gear set 4 are connected with each other and rotate together to transfer torque from the input shaft 2 to the rear drive output shaft 11 at a reduction ratio of 1 to effect direct rear two wheel drive. In this instance, the power from the input shaft 2 is transmitted to the output shaft 11 through the clutch 7 and carrier 44, bypassing the gears 41,42,43 to relieve their tooth faces of the loads which would otherwise be imposed thereon. In other words, the pinion 42 does not rotate relative to the sun gear 41 or ring gear 43. Thereby, service life of the respective gears is prolonged.

If during two wheel drive operation a change to four wheel drive is desired, a servo control valve (not shown) is actuated by a lever or switch which is provided in the vicinity of the driver's seat, gradually supplying the line pressure to the servo motor 80 to engage the clutch 8 smoothly, thereby coupling the output shaft 11 and sleeve 9 with each other. As a result, in addition to driving the rear drive output shaft 11, the power is transmitted simultaneously from the input shaft 2 to the front wheels through the linkage mechanism 14, output shaft 17 and front propeller shaft B to effect four wheel drive at a reduction ratio of 1. Again, the pinion 42 does not rotate relative to the sun gear 41 or ring gear 43.

When a greater output torque becomes necessary during four wheel drive operation, for example, for climbing a steep slope, the servo control valve is operated to supply line pressure gradually to the hydraulic servo motor 50 and at the same time to drain the hydraulic servo motor 70 with suitable timing, thereby gradually engaging the brake 5 while smoothly releasing the clutch 7. As a result, the sun gear 41 and carrier 44 are unlocked from each other and the ring gear 43 is fixed to the transfer casing 18. Thus, power is transmitted from the input shaft 2 to output shafts 11 and 17 after speed reduction through the sun gear 41, pinion 42 and carrier 44 to provide four wheel drive of a larger torque.

Table 1 indicates the engaged and released states of the brake 5 and clutches 7 and 8 in different modes of operation as provided by the transfer device of the invention.

TABLE 1

| Friction Element | 5 | 7 | 8 | Reduction Ratio |
|---|---|---|---|---|
| Two wheel drive | X | O | X | 1 |
| Four wheel drive (direct coupling) | X | O | O | 1 |
| Four wheel drive (at reduced speed) | O | X | O | $\frac{1+\lambda}{\lambda} = 3.0$ |

In Table 1, the symbols "O" and "X" denote the engaged and released states respectively of the friction element concerned, and the symbol "$\lambda$" represents a ratio in the number of teeth of the sun gear 41 to the ring gear 43. The reduction ratio given in the table is for the case where $\lambda = 0.5$, as an example.

As stated in the foregoing description, the transfer device of the invention, which employs a planetary gear set and wet type friction elements operated by hydraulic servo motors, is capable of applying and releasing the respective friction elements smoothly with accurate timing. Thus, switching between two wheel drive and four wheel drive is accomplished, as well as a speed change by the transfer device itself while the vehicle is traveling.

Further, according to the present invention, the power of the input shaft of the transfer device is delivered directly to an output shaft or shafts during the normal direct-coupling two or four wheel drive operations. This is done without transmitting power through the planetary gear set, relieving the gear set of unnecessary loads as described hereinabove.

Furthermore, the carrier of the planetary gear set is connected to one output shaft and to a cylinder of a hydraulic servo motor which is located on the side of the automatic transmission for releasably coupling the carrier with the sun gear. Accordingly, it is possible to provide a parking gear at an end portion of the transfer device contiguous to the automatic transmission. This requires only small modifications to the conventional parking mechanism of the automatic transmission instead of provision of a parking mechanism of a completely new design.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A torque transfer device for a four wheel drive vehicle having front and rear axles, comprising:
    an input shaft receiving torque from a gear transmission;
    a first output shaft rotatably coupled with either one of said front and rear axles;
    a second output shaft rotatably coupled with the other one of said axles;

a planetary gear set including a sun gear, a ring gear, a planetary pinion, and a planetary pinion carrier, said sun gear being coupled with said input shaft, said carrier being coupled with said first output shaft;

friction brake means for selectively and reversibly engaging said ring gear of said planetary gear set with a stationary portion of said torque transfer device;

first friction clutch means for selectively and reversibly engaging said planetary pinion carrier and said sun gear of said planetary gear set with each other;

a linkage mechanism including a sleeve rotatably mounted on said first output shaft, and a rotation transmitting mechanism provided between said sleeve and said second output shaft, and second friction clutch means between said first output shaft and said sleeve for selectively and reversibly engaging said sleeve and said output shaft with each other, whereby torque received at said input shaft is deliverable at said first and second output shafts simultaneously when said second friction clutch means is engaged and only at said first output shaft when said second friction clutch means is disengaged.

2. A torque transfer device as claimed in claim 1, wherein said first friction clutch means includes friction elements and is adapted to act between said gear transmission and said planetary gear set, said first friction clutch means comprising an annular hydraulic cylinder and a piston axially movable within said cylinder for engaging and disengaging said friction elements.

3. A torque transfer device as claimed in claim 2, and further comprising a gear formed on the outer periphery of said hydraulic cylinder of said first friction clutch means for meshing engagement with a parking lock pawl.

4. A torque transfer device as claimed in claim 1, wherein said rotation transmitting mechanism includes sprockets and a link chain.

5. A torque transfer device as claimed in claim 1, wherein said first friction clutch means includes friction elements and is adapted to act between said gear transmission and said planetary gear set, said first friction clutch means comprising an annular hydraulic cylinder connected to said planetary pinion carrier of said planetary gear set and a piston axially movable within said cylinder for engaging and disengaging said friction elements.

6. A torque transfer device as claimed in claim 1, and further comprising a housing, said friction brake means being positioned on said housing to stop said ring gear against said housing.

7. A torque transfer device as claimed in claim 5, and further comprising a gear formed on the outer periphery of said hydraulic cylinder of said first friction clutch means for meshing engagement with a parking lock pawl.

8. A torque transfer device as claimed in claim 1, wherein said first output shaft is coaxial with said input shaft.

9. A torque transfer device as claimed in claim 1, wherein said second friction clutch means includes friction elements and is adapted to act between said first output shaft and said sleeve, said second friction clutch means comprising a hydraulic cylinder fixed on said sleeve and a piston slidably fitted in said cylinder for engaging and disengaging said friction elements.

10. A torque transfer device as claimed in claim 5, wherein said second friction clutch means includes friction elements and is adapted to act between said first output shaft and said sleeve, said second friction clutch means comprising a hydraulic cylinder fixed on said sleeve and a piston slidably fitted in said cylinder for engaging and disengaging said friction elements.

* * * * *